United States Patent [19]
Nagahashi et al.

[11] Patent Number: 5,645,472
[45] Date of Patent: Jul. 8, 1997

[54] POLISHING DEVICE

[75] Inventors: Isao Nagahashi, Ayase; Yoshishige Takahashi, Nagaoka, both of Japan

[73] Assignee: Speedfam Company Limited, Tokyo, Japan

[21] Appl. No.: 633,195

[22] Filed: Apr. 16, 1996

[30] Foreign Application Priority Data

Dec. 22, 1995 [JP] Japan ................................. 7-350612

[51] Int. Cl.$^6$ ...................................................... B24B 7/17
[52] U.S. Cl. ........................... 451/261; 451/269; 451/287; 451/290
[58] Field of Search ............................... 451/36, 133, 134, 451/261, 262, 268, 269, 287, 290, 398

[56] References Cited

U.S. PATENT DOCUMENTS

| | | | |
|---|---|---|---|
| 2,688,215 | 9/1954 | Roshong et al. | 451/269 |
| 3,142,137 | 7/1964 | Fallon et al. | 451/262 |
| 3,425,169 | 2/1969 | Dunn | 451/269 |
| 3,458,957 | 8/1969 | Dunn et al. | 451/269 |
| 4,586,296 | 5/1986 | Saunders | 451/262 X |

FOREIGN PATENT DOCUMENTS

| | | | |
|---|---|---|---|
| 75064 | 3/1983 | European Pat. Off. | 451/269 |
| 2-71431 | 3/1990 | Japan . | |
| 3-93038 | 4/1991 | Japan . | |
| 4-370519 | 12/1992 | Japan . | |
| 5-54360 | 3/1993 | Japan . | |
| 5-303740 | 11/1993 | Japan . | |
| 174819 | 3/1961 | Sweden | 451/262 |

*Primary Examiner*—Timothy V. Eley
*Attorney, Agent, or Firm*—Kanesaka & Takeuchi

[57] ABSTRACT

A polishing device is formed of a pair of rotatable and elevatable upper supporting members provided with ring shape polishing pads at lower surface peripheries thereof, a pair of rotatable lower supporting members provided with ring shape polishing pads at upper surface peripheries thereof, a rotatable and elevatable disc holding device for holding a disc to be polished, and an arm for supporting the upper supporting members and the disc holding device. The polishing device further includes driving devices for rotating the upper supporting members, the lower supporting members and the disc holding device, respectively. The disc is independently rotated in a direction opposite to a rotating direction of the upper and lower supporting members to improve polishing efficiency. By setting rotating speeds of the supporting members and the disc, a regular working mark can be formed on the disc.

4 Claims, 3 Drawing Sheets

POLISHING DEVICE

BACKGROUND OF THE INVENTION AND RELATED ART STATEMENT

The present invention relates to a polishing device for polishing or grinding a base plate surface to be used for a magnetic disc and the like.

An example of a conventional polishing device is explained hereunder with reference to FIG. 4.

First, a disc shape base plate (hereinafter referred to as a disc) made of aluminum, aluminum alloy or the like is prepared, and after the disc is subjected to a surface treatment or beveling working, a Ni-P plating layer is formed on the surface thereof.

Next, a surface of the Ni-P plating layer is polished or ground by a polishing device 30 as shown in FIG. 4 so that average coarseness Ra is 0.004 μm and less.

A lower supporting portion 31 of the polishing device 30 includes an internal gear 32, a disc shape lower supporting member 33 and a sun gear 34 provided at a central portion of the lower supporting member 33. The lower supporting member 33 has a soft polishing pad 35, and is housed inside the internal gear 32. The gears 32 and 34 are rotated independently.

Also, carriers 36 are disposed on the lower supporting member 33, and have gear teeth, not shown, provided around the peripheries thereof for meshing with the internal gear 32 and the sun gear 34, and a plurality of through-holes 36a for holding the discs.

Further, although not shown, the polishing device 30 is provided with an upper supporting member having a polishing pad made of a soft material, such as foamed urethane, and a supply portion for supplying polishing particles.

In the polishing device 30 having the structure as described above, the upper supporting member is pressed against the lower supporting member 33 with a predetermined pressure, and while the polishing particles are supplying between the upper and lower supporting members through the supply portion, the internal gear 32, the lower supporting member 33, the sun gear 34 and the upper supporting member are rotated to thereby polish the discs.

When the discs are polished by the polishing device 30, the discs are held by the carriers 36 and rotated. However, since the carriers 36 are rotated freely, irregular rotations are given to the discs.

Thus, a regular working mark can not be obtained on the surfaces of the polished discs. When the regular working mark is not obtained, a subsequent texturing processing is also influenced, which finally results in a problem, such as a head crash or damages of the disc and head.

The present invention has been made in view of the foregoing problems of the conventional device.

Accordingly, one object of the invention is to provide a polishing device, wherein polishing efficiency can be extremely improved.

Another object of the invention is to provide a polishing device as stated above, wherein a regular working mark can be formed on a surface of a disc.

Further objects and advantages of the invention will be apparent from the following description of the invention.

SUMMARY OF THE INVENTION

A polishing device of the present invention includes a pair of upper supporting members, which are rotatable and movable up and down and are, respectively, provided with polishing pads at lower surfaces thereof; a pair of rotatable lower supporting members, respectively, provided with polishing pads at upper surfaces thereof; a disc holding device rotatable and movable up and down; a first driving device for rotating the upper supporting members; a second driving device for rotating the lower supporting members; a third driving device for rotating the disc holding device; and an elevating device for moving the upper supporting members and the disc holding device up and down together.

The disc holding device can hold a disc such that the disc contacts the upper and lower polishing pads for polishing. Namely, two side portions of the disc contact the upper and lower polishing pads at upper and lower sides thereof.

In the polishing device, the lower supporting members are rotationally situated on a base, and a plurality of positioning poles is situated on the base to extend upwardly therefrom. The elevating device slidably engages the positioning poles, so that the disc can be positioned easily.

A polishing method of the present invention uses the polishing device as explained above. In the method, radial area portions of the disc are sandwiched by the pair of the upper supporting members and the pair of the lower supporting members, and the disc is rotated at a speed different from rotating speeds of the upper and lower supporting members for polishing.

When the disc is rotated in a direction opposite to rotating directions of the upper and lower supporting members, a regular working mark can be formed on the disc.

DETAILED DESCRIPTION OF A PREFERRED EMBODIMENT

Figure 1:
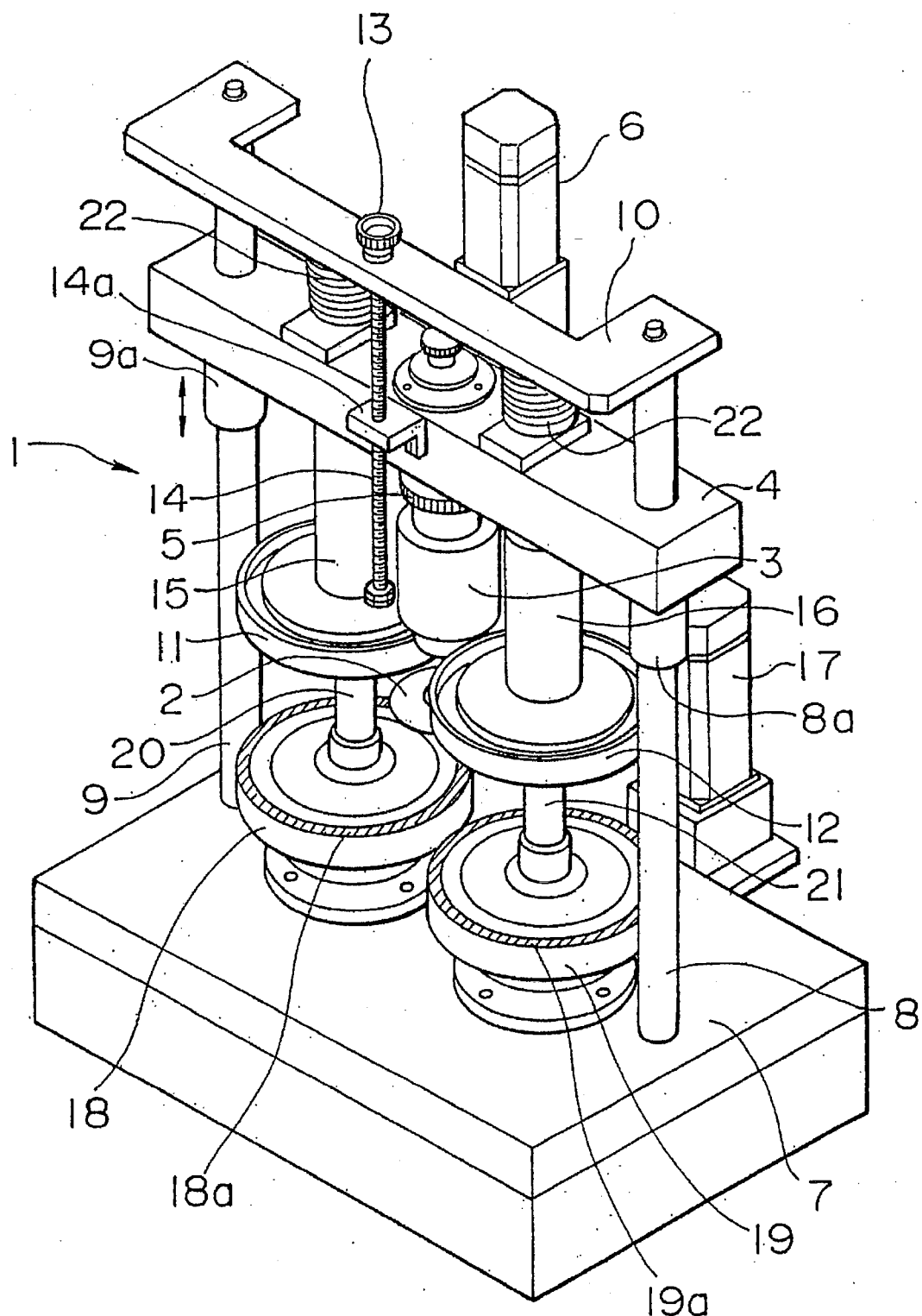
FIG. 1 is a perspective view for showing a polishing device according to the present invention.
Figure 2:
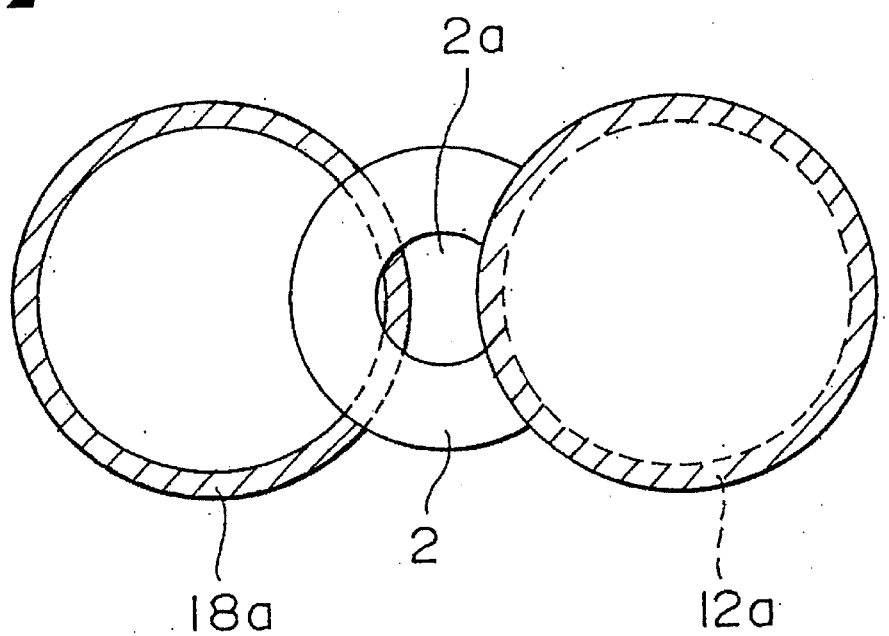
FIG. 2 is a plan view for showing an essential part of an example of a positional relationship between a disc and polishing pads.
Figure 3:
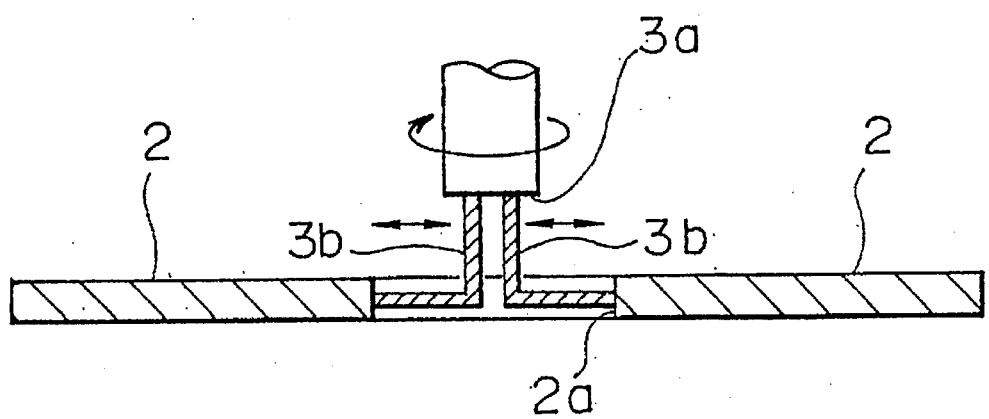
FIG. 3 is a sectional view for showing an essential part of an example of a disc holding device.
Figure 4:
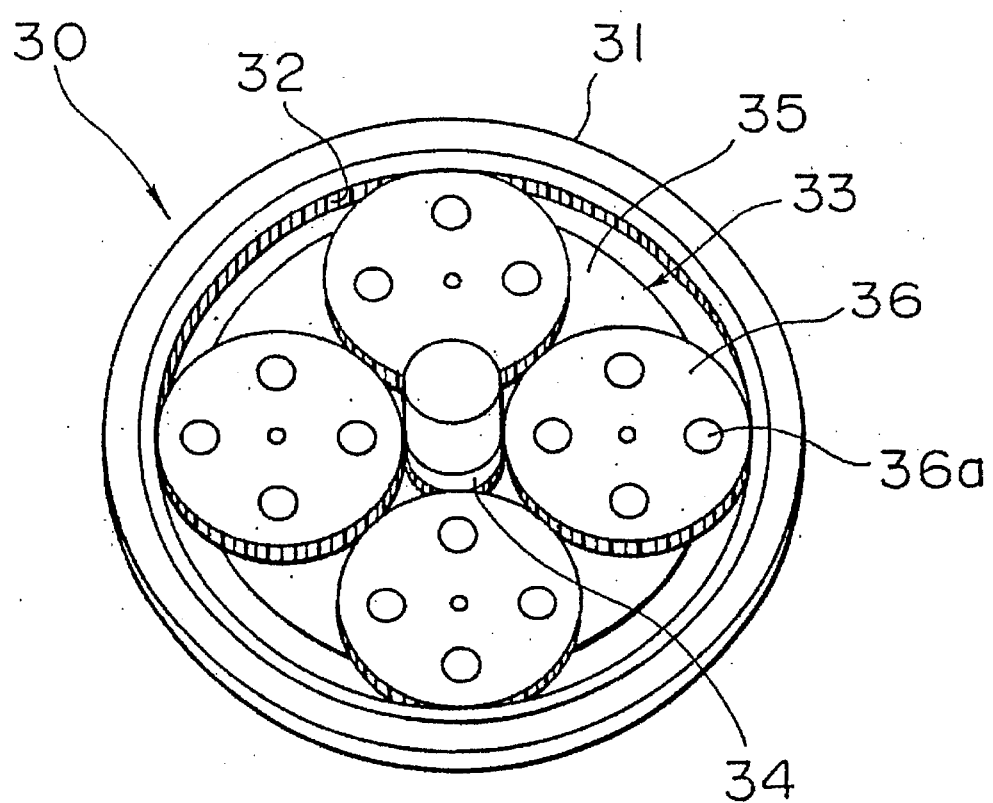
FIG. 4 is a perspective view for showing an essential part of a conventional polishing device.

Hereunder, based on FIGS. 1 to 3, a polishing device of the present invention and a polishing method using the same are described.

In FIG. 1, a polishing device 1 has a disc chuck 3 for holding a disc 2.

An upper end of the disc chuck 3 is rotatably supported by an elevatable arm 4. On an upper portion of the disc chuck 3, a gear 5 is fixed and meshed with a gear provided on a disc rotating motor 6, so that the disc chuck 3 can rotate.

Two supporting poles 8, 9 extending vertically and upwardly from a base stand 7 penetrate the arm 4 and bushes 8a, 9a. The arm 4 is supported by the supporting poles 8, 9 and is moved up and down.

On the upper ends of the supporting poles 8, 9, a top plate 10 is fixed parallel to the arm 4. At a central portion of the top plate 10, an elevation handle 13 for moving up and down the disc chuck 3 and a pair of upper supporting members 11, 12, described later, is provided, and coupled to a screw 14 for moving the arm 4 up and down.

The screw 14 penetrates through and engages with a nut plate 14a fixed to a central portion at a side surface of the arm 4. By rotating the elevation handle 13, the screw 14 is rotated to thereby elevate or lower the arm 4 along the supporting poles 8, 9.

The pair of upper supporting members 11, 12 provided respectively with ring-shape polishing pads along the lower surface peripheries is coupled to rotating shafts 15, 16, and is supported on the arm 4.

The pair of upper supporting members 11, 12 is connected to an upper supporting member driving motor 17 so that the upper supporting members 11, 12 can be reversibly rotated at a desired rotation speed.

Incidentally, in FIG. 2 described later, the ring shape polishing pad 12a, out of the ring shape polishing pads, provided on the upper supporting member 12 is shown, but the ring shape polishing pad provided around the lower surface periphery of the upper supporting member 11 is not shown in the drawing.

Also, on the arm 4 for supporting the upper supporting members 11, 12, fine adjusting devices, not shown, for finely adjusting the lowering distances of the respective upper supporting members 11, 12 are provided. The lowering distances of the upper supporting members 11, 12 are adjusted such that the lowering distances become short for the thickness of the disc 2 to be polished by the fine adjusting devices.

By the fine adjusting devices, when the arm 4 is lowered and the disc 2 and the pair of upper supporting members 11, 12 abut against a pair of lower supporting members 18, 19, described later, an excessive force applied to the disc 2 can be removed to thereby prevent breakage of the disc 2.

The pair of upper supporting members 11, 12 is situated at a position higher than that of the disc 2 supported by the disc chuck 3, and is provided with abrasive supply valves, not shown.

On the other hand, the pair of lower supporting members 18, 19 facing the pair of upper supporting members 11, 12 is rotationally mounted on the base stand 7. The lower supporting members 18, 19 are provided with ring shape polishing pads 18a, 19a on upper surface peripheries thereof, and are situated at a position lower than that of the disc 2.

Near the lower supporting members 18, 19, abrasive supply valves, not shown, are also provided to supply an abrasive to portions where the disc 2 and the lower supporting members 18, 19 slidingly contact with each other.

Also, at the central portions of the respective lower supporting members 18, 19, sliding shafts 20, 21 are vertically fixed. The sliding shafts 20, 21 are respectively inserted into holes formed in the inner portions of the rotating shafts 15, 16 coupled to the upper supporting members 11, 12. The sliding shafts 20, 21 constitute guides when the upper supporting members 11, 12 are elevated or lowered.

The pair of lower supporting members 18, 19 is connected to a lower supporting member driving motor, not shown, housed in an inner portion of the base stand 7, and is set to rotate at a desired rotation speed and a desired rotating direction.

Further, on the arm 4, a pair of weights 22 for pressing the disc 2 at a suitable load is provided. The weights 22 may be provided according to necessity.

FIG. 2 shows, in the polishing device 1, an example of the ring shape polishing pads 12a, 18a provided on the peripheries of the upper supporting member 12 and lower supporting member 18, and the disc 2 when polishing is carried out.

When the arm 4 is lowered down by rotating the elevation handle 13, the disc 2 and the upper supporting members 11, 12 abut against the lower supporting members 18, 19, respectively. Each ring shape polishing pad is positioned in radial area portions of the disc 2 and crosses a part of a disc hole 2a provided at a center of the disc 2.

In order to carry out the polishing in such a state as described above, as shown in FIG. 3, a forward end 3a of the disc chuck 3 is provided with a plurality of L-shape members 3b for radially outwardly and symmetrically abutting against and pressing an inner periphery of the disc hole 2a formed in the disc 2. The L-shape members 3b support and hold the disc 2.

With this structure, the ring shape polishing pads can cross or pass over the disc hole 2a formed at the central portion of the disc 2, so that the polishing pads can be set in the positional relationship shown in FIG. 2.

Hereunder, a polishing method using the polishing device 1 of the present invention is explained based on a working sequence of the polishing device having the above described structure of the present invention.

Step 1

The disc 2 is held by the disc chuck 3.

Step 2

The elevation handle 13 is rotated to start lowering the arm 4.

Step 3

The arm 4 is lowered to a position where a lower surface of the disc 2 abuts against the lower supporting members 18, 19 so that the upper supporting members 11, 12 and the lower supporting members 18, 19 sandwich the disc 2.

Step 4

An abrasive is supplied to the disc 2.

Step 5

The disc 2 is rotated around an axis at a predetermined speed, and at the same time, the upper and lower supporting members 11, 12, 18, 19 are also rotated at a predetermined speed in a direction opposite to a rotating direction of the disc 2.

Step 6

A surface finishing work for the disc 2 is started.

As described above, in the polishing method using the polishing device of the present invention, by independently controlling the rotating speed and the rotating direction of the disc 2 and the rotating speeds and rotating directions of the upper and lower supporting members by the respective motors as desired, a polishing speed can be changed as desired to thereby improve polishing efficiency.

Also, by rotating the disc 2 in the direction opposite to the rotating direction of the upper and lower supporting members and setting the disc 2 at a predetermined rotating speed, a regular working mark can be formed on the disc 2.

In the embodiment of the present invention, although the ring shape polishing pads are used, a width of the ring shape polishing pad may be set as desired according to a diameter of a disc to be polished.

When the disc is polished by the polishing device and the method using the polishing device of the present invention, a predetermined rotation can also be applied to the disc, so that polishing efficiency can be extremely improved.

Also, a regular working mark can be formed on the disc.

While the invention has been explained with reference to the specific embodiment of the invention, the explanation is illustrative, and the invention is limited only by the appended claims.

What is claimed is:

1. A polishing device for a disc comprising, a pair of upper supporting members having upper polishing pads at lower surfaces thereof, said upper supporting members being rotatable and movable up and down;

a first driving device connected to the upper supporting members for rotating the upper supporting members;

a pair of lower supporting members having lower polishing pads at upper surfaces thereof, said lower polishing pads facing the upper polishing pads;

a second driving device connected to the lower supporting members for rotating the lower supporting members;

a disc holding device situated between the upper supporting members and between the lower supporting members, said disc holding device being rotatable and movable up and down and adapted to hold, in polishing, a disc such that the disc contacts the upper and lower polishing pads for polishing;

a third driving device connected to the disc holding device for rotating the disc holding device;

an elevating device rotationally holding the upper supporting members and the disc holding device for moving the upper supporting members and the disc holding device together;

a base on which said lower supporting members are rotationally situated; and a plurality of positioning poles situated on the base to extend upwardly therefrom, said positioning poles passing through the elevating device for supporting the same.

2. A polishing device as claimed in claim 1, wherein said upper and lower polishing pads are ring-shape polishing pads.

3. A polishing device as claimed in claim 1, wherein said disc holding device includes a plurality of L-shape members engaging an inner periphery of a hole of the disc for holding the disc.

4. A polishing device as claimed in claim 1, further comprising sliding shafts fixed at the central portions of the lower supporting members, said sliding shafts being inserted into holes of rotating shafts of the upper supporting members.

* * * * *